Aug. 12, 1941.                C. A. RAFFERTY                2,251,954
TEMPERATURE COMPENSATION FOR PRESSURE ACTUATED INDICATORS
Filed June 25, 1940
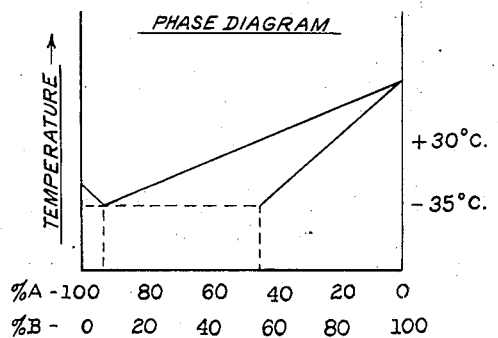
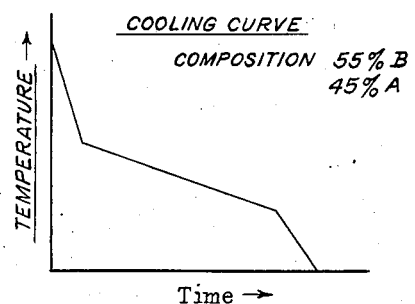
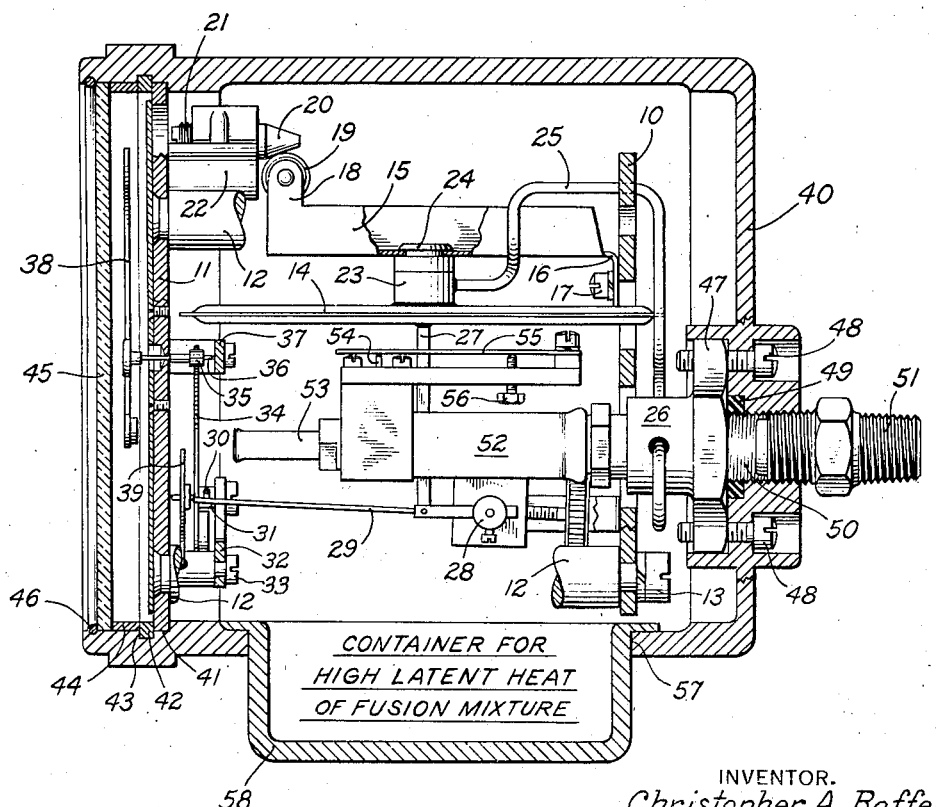
INVENTOR.
Christopher A. Rafferty
BY
Gerstvik & Kalman
ATTORNEY.

Patented Aug. 12, 1941

2,251,954

UNITED STATES PATENT OFFICE 2,251,954

TEMPERATURE COMPENSATION FOR PRESSURE ACTUATED INDICATORS

Christopher Alois Rafferty, Brooklyn, N. Y., assignor to Bendix Aviation Corporation, Bendix, N. J., a corporation of Delaware Application June 25, 1940, Serial No. 342,359

10 Claims. (Cl. 73—179)

The present invention relates to pressure responsive indicating instruments, and more particularly to rate of climb indicators wherein a differential between the pressures on two sides of a pressure responsive element, established by a change in one of said pressures, is utilized to operate an indicator, and wherein means are provided for the equalization of said pressures when pressure change no longer takes place. It is to be understood, however, that the invention is not to be limited to its use only with rate of climb instruments but may be applied as well as aneroid altimeters, manifold pressure gauges, airspeed indicators and the like.

Prior art devices of the above character have been subjected to error arising from other pressure differentials resulting from temperature changes.

The problems of rate of change of temperature compensation have been solved to some extent by the use of metal strips arranged to respond to the rate of temperature changes in the manner disclosed in the copending application of Alfred E. Sidwell, Serial No. 216,580, filed June 29, 1938. Another solution of this problem has been disclosed in my copending application, Serial No. 322,852, filed March 7, 1940 and Serial No. 342,360, filed June 25, 1940.

One of the objects of the present invention is to provide novel temperature compensating means for pressure actuated indicating instruments whereby the error due to the pressure differential arising from sudden temperature changes will be counteracted and substantially reduced if not entirely eliminated.

Another object of the invention is to provide novel compensating means wherein the compensating effect is produced by and in accordance with the rate of temperature change which the instrument undergoes.

A further object if the invention is to provide novel compensating means whereby the compensating effect is introduced within the instrument in order to decrease the rate of change of temperature within the instrument when the latter is subjected to sudden temperature changes.

Still another object of the invention is to provide an instrument of the type characterized above with a novel temperature compensating means comprising a composition having a slow cooling rate from a liquid state to solid state over a desired temperature range, whereby the rate of change of temperature within the instrument casing due to sudden temperature changes will be decreased thus counteracting the error resulting from such temperature changes.

A still further object is to provide a novel instrument of the pressure responsive type which requires substantially no insulation against changes in temperature.

Still another object of the invention is to provide a novel rate of climb indicator of dependable performance which will be accurate under all changes and rates of change in temperature.

The above and further objects and advantages of the invention will appear more fully hereinafter from a consideration of the detailed description which follows, taken together with the accompanying single sheet of drawings wherein one embodiment of the invention is illustrated. It is to be expressly understood, however, that the drawings are for the purposes of illustration and description only and are not designed as a definition of the limits of the invention, reference primarily being had to the appended claims for this purpose.

In the drawing:

Figure 1 is a phase diagram of one form of composition comprising the novel compensating means of the present invention;

Figure 2 is a cooling curve of the composition of Figure 1; and

Figure 3 is a side elevation, partly in section, of the operating mechanism and casing of one form of instrument embodying the novel compensating means of the present invention.

In considering the properties of gases, it is well known that the specific gravity of a gas increases with a decrease in temperature thereby decreasing the pressure of the gas, and that upon an increase in temperature the specific gravity of the gas decreases with a corresponding pressure increase in the gas.

The principle of the rate of climb instrument depends upon the pressure differential developed in a chamber vented to the atmosphere by a restriction. This pressure differential results from the changing absolute pressure with the varying altitudes traversed. It will appear, therefore, that due to temperature differentials existing at the interior and exterior of the instrument, additional pressure changes will occur and the instrument will no longer indicate the true rate of climb or descent. The present invention is directed to overcome the indication due to pressure differential arising from the differential temperatures to which the instrument has been subjected.

Referring now more particularly to the theory involved in the present invention, reference is made to Figure 1 wherein is illustrated a phase diagram of the characteristics of two or more elements, each having a different latent heat of fusion and a different melting point. Assume, for example, that element A standing alone will give off its latent heat of fusion somewhere around −30° C., the latter being the critical temperature at which the element will undergo a physical change such as from a liquid state to a solid state. In referring to Figure 1, it will be observed that upon combining element A and element B, the latter having a relatively higher latent heat of fusion and a higher melting point, the critical temperature will be lowered with a small addition of element B and then increase proportionately as the percentage of element B, utilized with element A, is increased. Element A may comprise mercury while element B may be an element such as bismuth having a high critical temperature at which the latent heat of fusion is given off when the latter element changes from a solid to liquid form.

In providing the mixture of the two elements, as above described, the latent heat of fusion of the composition will not be precipitated at but one temperature. A most desirable mixture would be one wherein the two elements combined have a cooling curve such as that disclosed in Figure 2 wherein the cooling rate of the mixture is the slowest between +30° C. and −30° C. A mixture of this nature may constitute 55% of mercury and 45% of bismuth, but it is to be understood that other elements may be used as well.

A mixture of the above nature may be disposed within a pressure actuated instrument and when the temperature outside of the instrument casing decreases the inrushing colder gases do not only have to act to cool the gases within the casing but must also act to cool the mixture which has been at higher temperature at that point. Obviously, therefore, the presence of the mixture acts to decrease the rate of change of temperature within the casing obviating the pressure differential that would otherwise occur without the presence of the mixture. The opposite is likewise true when the casing is subjected to higher temperatures. The gases at the higher temperatures entering the casing do not only act to heat the gases within the casing but also must act to raise the temperature of the mixture, consequently the rate of change of temperature will be decreased and the pressures therein remain substantially equalized with the outside pressures.

Referring now to Figure 3, the foregoing principle is shown applied, in accordance with the present invention, to a pressure responsive indicating instrument which, in the present embodiment, is shown in the form of a rate of climb indicator having its operating mechanism mounted within a suitable casing on a frame of any suitable type and construction. In the form shown, said mechanism comprises a rear frame member or plate 10 and a face plate 11, said plates being held in spaced relation in any suitable manner as by spacers 12 and screws 13. Mounted in the frame is a pressure responsive element or diaphragm 14 of any suitable type that is adapted to operate a suitable indicator or pointer when a pressure differential is established between the pressure inside of the element and the pressure surrounding the element within the casing. This may be accomplished, for example, by providing free communication between the inside of the diaphragm and the atmosphere outside of the instrument casing, while interposing flow-retarding means, such as a diffuser, between said outside atmosphere and the inside of the casing in which the diaphragm is mounted.

The diaphragm 14 is mounted in any suitable manner on a flexible channeled arm 15 which is carried by a bracket 16, formed integrally therewith if desired, which bracket is secured to rear plate 10 by suitable means such as screws 17.

To provide for zero adjustment of the instrument, the free end of arm 15 is provided with an upwardly extending portion 18 carrying a roller 19 so as to engage in frictionless contact the coned end 20 of a set screw 21 carried by a member 22 formed on one of the spacers 12. The diaphragm 14 may be supported by means of a central boss 23 secured to the arm 15 by any suitable means such as a grommet 24, said boss being hollow and connected to tube 25 communicating with a coupling chamber 26 that is vented to the outside atmosphere through the casing of the instrument.

Actuating mechanism is provided between the diaphragm 14 and the indicator of the instrument. In the form shown in the drawing, such mechanism may constitute a link 27 mounted on the diaphragm for reciprocating action in accordance with the contraction or expansion of the diaphragm. The movement of link 27 may be transferred in any suitable manner, as by means of a rock-shaft 28, to an arm 29 which is adapted to engage a finger 30 carried by a spindle 31 journalled in a plate 32 secured to plate 11 by suitable means such as a screw 33. The spindle 31 is further provided with a counter-weighted gear sector 34 adapted to mesh with a pinion 35 splined to a spindle shaft 36 journaled in a bracket 37 at one end and carrying an indicator or pointer 38 at its other end as shown in Figure 3.

The finger 30 carried by the spindle 31 is engaged by the end of arm 29 for rotation thereby in one direction, and a suitable hair-spring 39 tends to rotate the spindle 31 in the opposite direction whereby expansion and contraction of the diaphragm 14 is converted into rotation of the spindle 31 and gear sector 34 in one or the other direction and consequent operation of the indicator 38 through pinion 35.

The mechanism above described is mounted in an instrument casing 40 so constructed as to provide a substantially sealed chamber enclosing the diaphragm 14 which communicates with the atmosphere outside the casing through coupling chamber 26. As shown in Figure 3, the complete mechanism is enclosed within the casing 40. The face plate 11 is seated against a shoulder 41 formed in the casing and held therein by a split ring 42 which engages the underside of a shoulder 43 also formed in the casing. The open end of casing 40 is suitably closed as by means of a split spacing ring 44 and a cover glass 45 held in place by a suitable split ring 46.

The coupling chamber 26 is provided with a flange or bolt 47 adapted to be securely fastened to the rear portion of the casing 40 by suitable means such as screws 48 and a seal-tight fit is effected by way of a sealing gasket 49. The interior of the coupling chamber 26 communicates with the exterior of the casing by means of a threaded passage 50 provided in the rear of the casing adapted to receive a threaded nipple 51 and with the interior of diaphragm 14 by way of conduit or tube 25. Diffusing means, on the other hand, are interposed between the outside atmosphere and the inside of the casing, the latter being of the type disclosed in the issued patent to James E. Bevins, No. 2,147,962.

Diffusion means of the type described in the above patent, for example, provide restricted communication between the inside and outside of the casing and comprise means whereby equalization of the pressure inside and outside of the diaphragm may be properly regulated. In the present embodiment said means may comprise a hollow member 52 suitably connected to a coupling chamber 26 by an air-tight connection. Suitable diffusing elements are provided for closing the ends of the hollow member 52. One of said elements, which is shown as a hollow porcelain tube 53 closed at one end and connected to the hollow member 52 at the other end, closes the right hand hollow member 52 and controls the diffusion of the air between the inside of the instrument casing and the interior of the hollow member 52, while a second similar porcelain member (not shown) is located within the hollow member 52 and controls the diffusion of air between the interior of said hollow member and the outside atmosphere by means of coupling member 26 and passage 50. The hollow member 52 is also provided with an outlet in which is disposed a temperature controlled by-pass valve, the stem 54 of which is controlled in its position by the temperature responsive element 55 adjustably positioned by screw 56. It is to be noted that the element 55 is responsive to the amount of temperature changes and is not actuated in response to the rate of said temperature change. The details of said diffusing means do not constitute a part of the present invention and are fully disclosed in the above-mentioned patent to Bevins to which reference is hereby made for details of the construction thereof.

The novel temperature compensating means of the present invention are now provided, and for this purpose the bottom portion of the casing 40 is, in the present instance, formed with a recess 57 so as to receive and support a container 58 for enclosing a mixture possessing a high latent heat of fusion such as that hereinabove described.

The container 58 should be formed of material having good thermal conductivity so as to insure a very small temperature difference between the mixture and the air in the casing. Any suitable means may be provided further so as to isolate the mixture within the container thus preventing its displacement therefrom.

In operation, as the craft embodying the instrument above described passes from a warm surrounding to a colder one, the colder temperatures tend to decrease the pressure within the casing of the instrument. The colder gases surrounding the casing must not only cool the gases within the casing but also the mixture, and the presence of the latter consequently operates to decrease the rate of change of temperature within the casing, thus reducing or substantially eliminating a pressure difference in the diaphragm and thereby preventing erroneous indication due to rapid temperature change. As has been described before, the converse is likewise true when the craft passes from a cold surrounding to a warmer one. In this latter situation the mixture within container 58 must also be heated and in this manner the rate of change of temperature within the casing is decreased.

Although one embodiment of the invention has been illustrated and described, other changes and modifications in form, materials, and relative arrangement of parts, which will now appear to those skilled in the art, may be made without departing from the scope of the invention. Reference is now made to the appended claims for a definition of the limits of the invention.

What is claimed is:

1. In an instrument of the class described having a pressure chamber, means comprising flow-retarding means providing restricted communication between the outside atmosphere and the interior of said chamber, means responsive to the differential in pressure within said chamber, and outside of said chamber, and means effective during rapid temperature changes exterior to said chamber for modifying the rate of change of temperature within said chamber.

2. In a rate of climb indicator having a pressure chamber, means comprising flow-retarding means providing restricted communication between the outside atmosphere and the interior of said chamber, means responsive to the differential in pressure within said chamber and outside of said chamber, and means disposed within said chamber effective upon rapid changes in temperature outside of said chamber for modifying the rate of change of temperature within said chamber.

3. In an instrument of the class described, a substantially air-tight casing, a pressure responsive element in said casing and having its interior in communication with the atmosphere outside of said casing, a diffuser assembly providing restricted communication between the interior of said casing and the atmosphere outside thereof, and means communicating with the interior of said casing for modifying the rate of change of temperature within said casing during rapid temperature changes.

4. In a rate of climb indicator, a sealed casing, a pressure responsive element in said casing and having its interior in communication with the atmosphere outside of said casing, a diffuser assembly providing restricted communication between the interior of said casing and the atmosphere surrounding said casing, and means disposed within said casing effective during rapid temperature changes for modifying the rate of change of temperature within said casing.

5. In a rate of climb indicator, a substantially air-tight casing, a pressure responsive element in said casing and having its interior in communication with the atmosphere outside of said casing, means providing restricted communication between the interior of said casing and the atmosphere outside of said casing, and means comprising a substance having a relatively slow cooling curve for modifying the rate of change of temperature within said casing during rapid temperature changes.

6. In an instrument of the class described, a substantially air-tight casing, a pressure responsive element in said casing and having its interior in communication with the atmosphere outside of said casing, a diffuser assembly providing restricted communication between the interior of said casing and the atmosphere outside thereof, and means comprising a mixture of mercury and bismuth providing a substance having a slow cooling rate for modifying the rate of change of temperature within said casing during rapid changes in temperature exterior of said casing.

7. In combination, an expansible diaphragm having a yielding wall subject to a changing atmospheric pressure on one side thereof, means for retarding the rate at which pressure on the other side of said yielding wall tends to equalize with said changing atmospheric pressure due to changes in altitude, indicating means actuated by said yielding wall in accordance with the rate of change of altitude, and means in communication with said last-named side of said yielding wall for modifying the rate of change of temperature on the latter during sudden temperature changes.

8. In a rate of climb indicator, a substantially air-tight casing, a pressure responsive element in said casing and having its interior in communication with the atmosphere outside of said casing, means providing restricted communication between the interior of said casing and the atmosphere outside of said casing, thermally conductive means carried by said casing, and means disposed within said thermally conductive means for modifying the rate of change of temperature within said casing during rapid temperature changes.

9. In an instrument of the class described having a pressure chamber, means comprising flow-retarding means providing restricted communication between the outside atmosphere and the interior of said chamber, means responsive to the differential in pressure within said chamber and outside of said chamber, and means comprising a mixture of chemical elements or compounds having different melting points for modifying the rate of change of temperature within said chamber during rapid temperature changes.

10. In a pressure responsive device, a casing, a pressure responsive element in said casing and subject to differential pressures produced by a difference in pressure between the inside and outside of said casing, whereby undesirable expansion and contraction of said element occurs, and means comprising a substance having a relatively slow cooling curve and responsive to the temperature within said casing for modifying the rate of change of temperature within said casing during rapid temperature changes.

CHRISTOPHER A. RAFFERTY.